T. M. BORGLUM.
TEST SCALE TABLE.
APPLICATION FILED MAR. 23, 1920.

1,376,997.

Patented May 3, 1921.
3 SHEETS—SHEET 1.

Inventor
T. M. Borglum
By R. M. McCracken,
his Attorney

T. M. BORGLUM.
TEST SCALE TABLE.
APPLICATION FILED MAR. 23, 1920.
1,376,997.
Patented May 3, 1921.
3 SHEETS—SHEET 2.
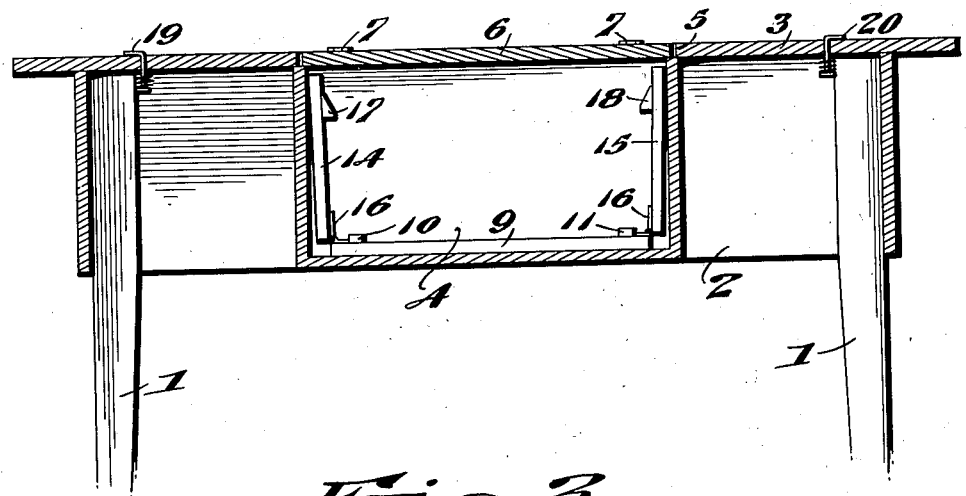
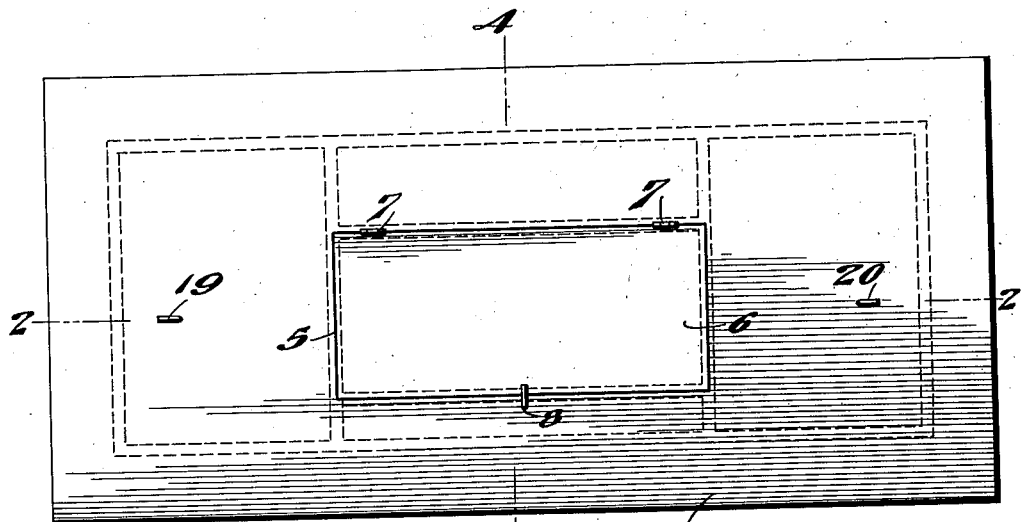
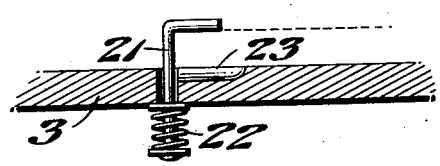
Inventor
T. M. Borglum
By R. M. McCracken
his Attorney

T. M. BORGLUM.
TEST SCALE TABLE.
APPLICATION FILED MAR. 23, 1920.

1,376,997.

Patented May 3, 1921.
3 SHEETS—SHEET 3.

Inventor
T. M. Borglum
By R. M. McCracken
his Attorney

UNITED STATES PATENT OFFICE.

TORVALD M. BORGLUM, OF REEDSPORT, OREGON.

TEST-SCALE TABLE.

1,376,997.  Specification of Letters Patent.  Patented May 3, 1921.

Application filed March 23, 1920. Serial No. 368,044.

*To all whom it may concern:*

Be it known that I, TORVALD M. BORGLUM, citizen of the United States, residing at Reedsport, in the county of Douglas and State of Oregon, have invented certain new and useful Improvements in Test-Scale Tables, of which the following is a specification.

This invention relates to test scale tables, the primary object being to provide a table which will support a cream sample scale for most efficient use and which has a body constructed to receive and incase the scale when not in use.

A further object resides in so constructing the table that when the cream sample or test scale is placed within the space provided in the body thereof a cover closed down over the scale will keep the same clean and dry and will present a substantially smooth top for the table.

Yet another object is to provide a scale supporting and carrying structure which fits within the body of the table and gives additional protection to the scale when not in use, and by which the scale is conveniently lifted from the recess of the table body and brought to a position for use at any time when wanted.

A still further object is to arrange the scale supporting and carrying structure in such a manner that the parts thereof which protect the scale when not in use can be moved out of the way to leave the scale entirely accessible when in use, and to provide means by which this carrying and supporting structure is secured in place on the table top to present the scale for most convenient and efficient use.

With the above and other objects in view which will be apparent from the specification, drawings, and claims, this invention includes certain novel features of construction and combinations of parts which will now be set forth:

In the drawings:

Fig. 2 is a longitudinal vertical sectional view taken substantially along line 2—2 of Fig. 3.

Fig. 3 is a plan view to better show the construction and arrangement of the table top.

Fig. 7 is a fragmentary sectional view showing one form of spring catch which might be used.

Figure 1:
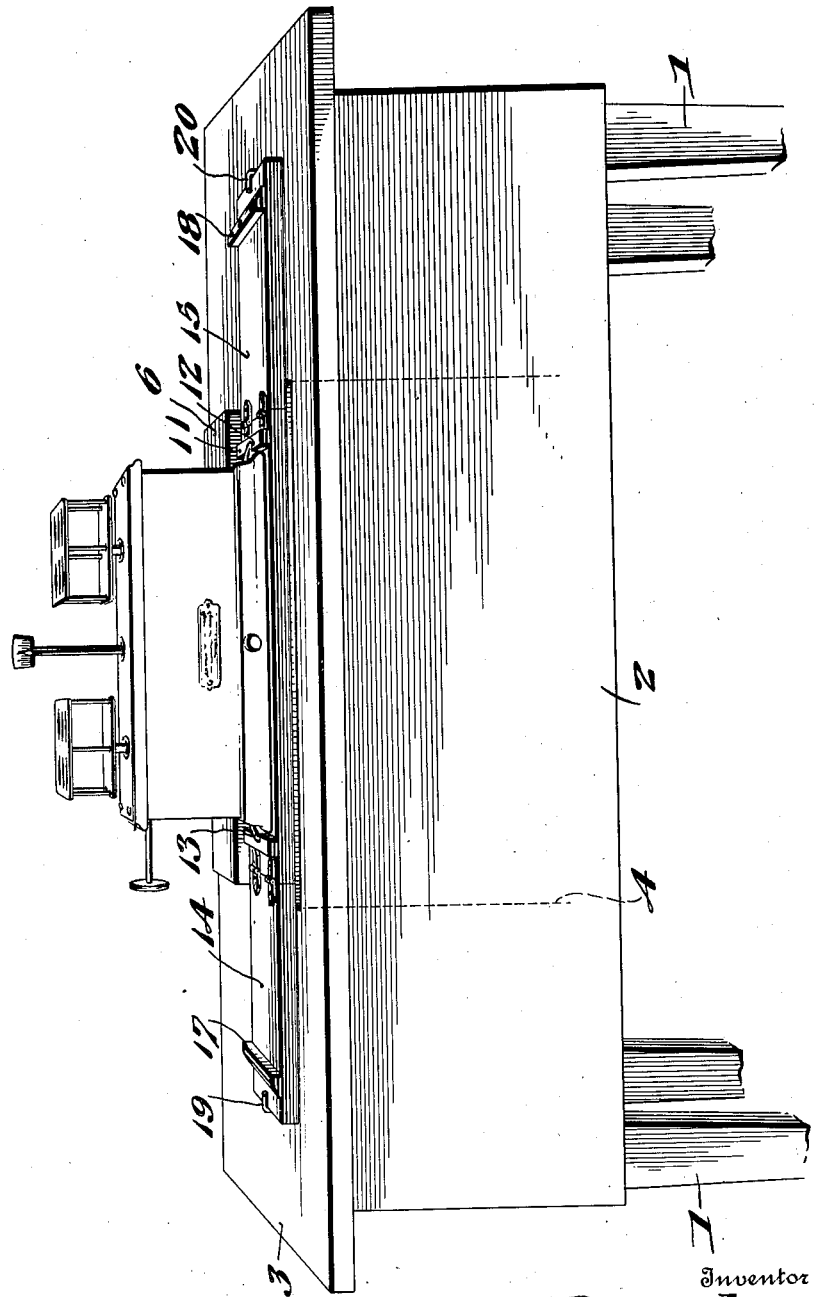
Figure 1 is a perspective view showing a table constructed in accordance with my invention and with the test scale positioned for use.
Figure 4:
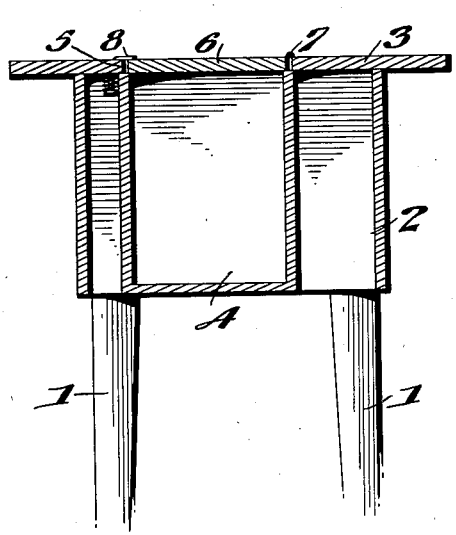
Fig. 4 is a transverse vertical sectional view on line 4—4 of Fig. 3 with the cover portion of the table top closed.

In creameries and other places where cream sample scales or test scales are used quite a little difficulty is experienced in so placing the scale and in providing a cover for the same that they will be kept clean and dry and will yet be conveniently accessible whenever wanted, and it is the purpose of my invention to provide a table constructed especially to receive a test scale and which will overcome the difficulties heretofore experienced.

In the present disclosure I have shown the table supported by four legs 1, 1, although other means of support might be employed. A body 2 is built upon these legs and this is surmounted and covered by a top or slab 3. Where legs are employed it is preferable that these be made readily removable for packing and shipping the tables, and these legs are of such length that the top or slab is of a height to support a test scale at an elevation for most convenient and efficient use.

The body of the table is closed in to form a scale receiving compartment 4, and the top 3 is provided with an opening 5 through which access is had to compartment 4. A cover 6 is hinged at 7 to close down within the opening 5 and make the table top substantially continuous. A catch 8 is provided to retain the cover in the closed position over compartment 4.

Figure 6:
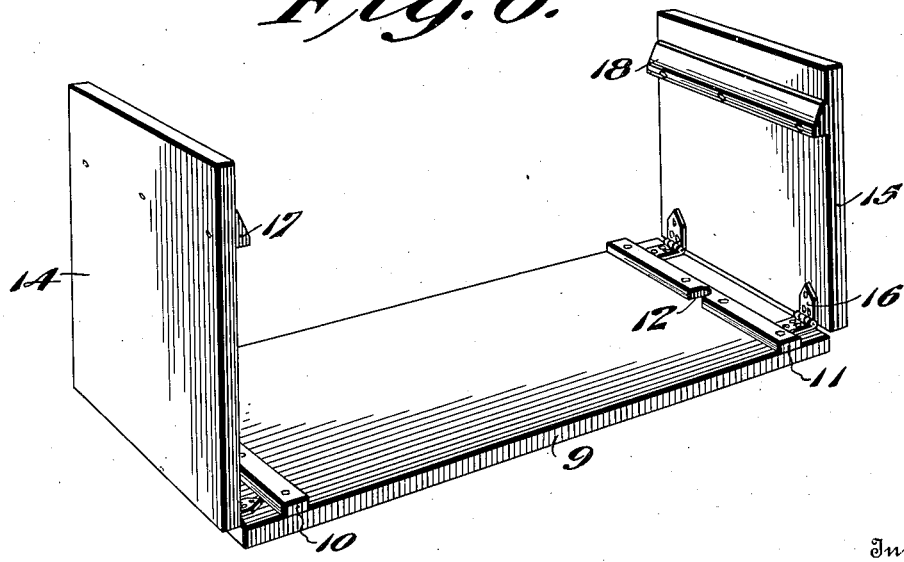
Fig. 6 is an enlarged perspective view of the scale supporting and carrying structure.

A scale supporting and carrying structure, best shown in Fig. 6, is made up of a scale receiving base 9, preferably made of wood and having batten strips 10 and 11 secured adjacent its ends on the upper side. The base 9 is made of a length that a test scale will fit between the batten strips 10 and 11, and of sufficient width to extend slightly beyond the sides of the scale. The batten strips are provided with central notches 12 to receive lugs or extensions 13 on the test scale and thus the scale is held in proper position on the base. End members 14 and 15, also preferably of wood, are connected by hinges 16 at the ends of base member 9, and adjacent their free edges have batten strips 17 and 18 mounted transversely. This scale supporting and carrying structure is of a size to accommodate a test scale when the end members 14 and 15 are swung to vertical positions, and these end members are preferably of sufficient length to rise slightly above the test scale structure and give protection to the same from the ends.

Figure 5:
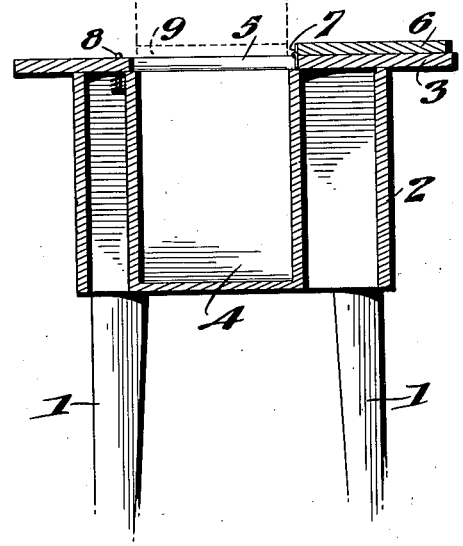
Fig. 5 is a sectional view similar to Fig. 4 with the cover portion swung back and the operative supporting position of the scale carrying structure shown by the dotted lines.

The opening 5 is preferably centered between the ends of the table top 3, and the compartment 4 is of a size to receive the scale supporting and carrying structure in a more or less close fit with the ends thereof swung up. When the supporting and carrying structure, with a scale thereon is placed within compartment 4 and door 6 is closed a substantially continuous table top will be presented, catch 8 acting to maintain the cover in a tightly closed relation, and the scale will be kept clean and dry. When cover 6 is swung back, as shown in Fig. 5, the compartment 4 is left open and a party wishing to use the scale can readily remove the same from the compartment by catching his fingers beneath the batten strips 17 and 18 of end members 14 and 15 and lifting the supporting and carrying structure from the compartment. End members 15 and 14 are next swung down to leave the scale free and unobstructed on all sides, and hook catches 19 and 20 adjacent the ends of the table top or slab 3 are caught over these end members to hold the same flat against the top.

These hook catches act to hold end members 14 and 15 in a plane with base 9 and to retain the carrying structure from dropping through opening 5 into compartment 4, and as the scale is fixedly held on base 9 it will be retained in the desired position for use. In covering the scale or inclosing the same, catches 19 and 20 are released, end members 14 and 15 are swung up to the vertical positions and by catching beneath batten strips 17 and 18 the supporting structure is lowered into compartment 4; cover 6 is swung to close opening 5 and is retained in this closed position by catch 8. It is preferable that catches 8, 19 and 20 be constructed substantially as shown in Fig. 7, where the shank 21 is fitted loosely through table top 3 and a spring 22 is received around the lower end to exert resilient force to draw down the hook end of the catch against the cover and the end portions. If desired the table top might be grooved as at 23 to receive this hook portion when the catch is not in use and no projection will then be presented.

From the foregoing it will be seen that I have provided a table structure for use with cream sample or test scales which will protect and will keep the same clean and dry when not in use; and, which at the same time holds the same conveniently accessible at any time wanted, and supports the scales most efficiently when in use.

While I have shown and described but one specific embodiment and have mentioned only certain possible modifications, it will be appreciated that a number of changes and modifications to meet varying conditions of use might be resorted to, in view of which I do not wish to be limited to the exact disclosure but only to such points as may be set forth in the claims.

I claim:

1. A test scale table including with a table body portion having a scale receiving compartment therein, a scale supporting and carrying structure adapted to be placed within said compartment consisting of a base member on which the scale is set and end members hinged at the extremities of said base to be swung down when the scale is to be used and swung up to protect the scale when placed within the compartment.

2. A test scale table including with a table body portion having a scale receiving compartment therein, a scale supporting and carrying structure adapted to be placed within said compartment consisting of a base member on which the scale is set, end members hinged at the extremities of said base to be swung down when the scale is to be used and swung up to protect the scale when placed within the compartment, said base member having portions thereon to retain the scale in place and said end members being provided with hand grip portions by which the supporting and carrying structure is held when raised from and lowered into said compartment, a table top mounted on said body portion provided with an opening through which access is had to said compartment, and a cover portion hinged on said top to be swung into the opening thereof to close said compartment and to present a substantially continuous and smooth table top surface.

3. A test scale table including with a table body portion having a scale receiving compartment therein, a scale supporting and carrying structure adapted to be placed within said compartment consisting of a base member on which the scale is set, end members hinged at the extremities of said base to be swung down when the scale is to be used and swung up to protect the scale when placed within the compartment, said base member having portions thereon to retain the scale in place and said end members being provided with hand grip portions by which the supporting and carrying structure is held when raised from and lowered into said compartment, a table top mounted on said body portion provided with an opening through which access is had to said compartment, a cover portion hinged on said top to be swung into the opening thereof to close said compartment and to present a substantially continuous and smooth table top surface, and means to engage with said end members of the scale supporting and carrying structure when flattened out upon the table top to hold said structure in place thereon with the base member covering the opening through the table top.

In testimony whereof I affix my signature.

TORVALD M. BORGLUM.